Dec. 16, 1952  J. H. WILLS  2,622,034
METHODS OF PROCESSING RAW SHRIMP MEAT FOR MARKET
Filed April 5, 1951  2 SHEETS—SHEET 1
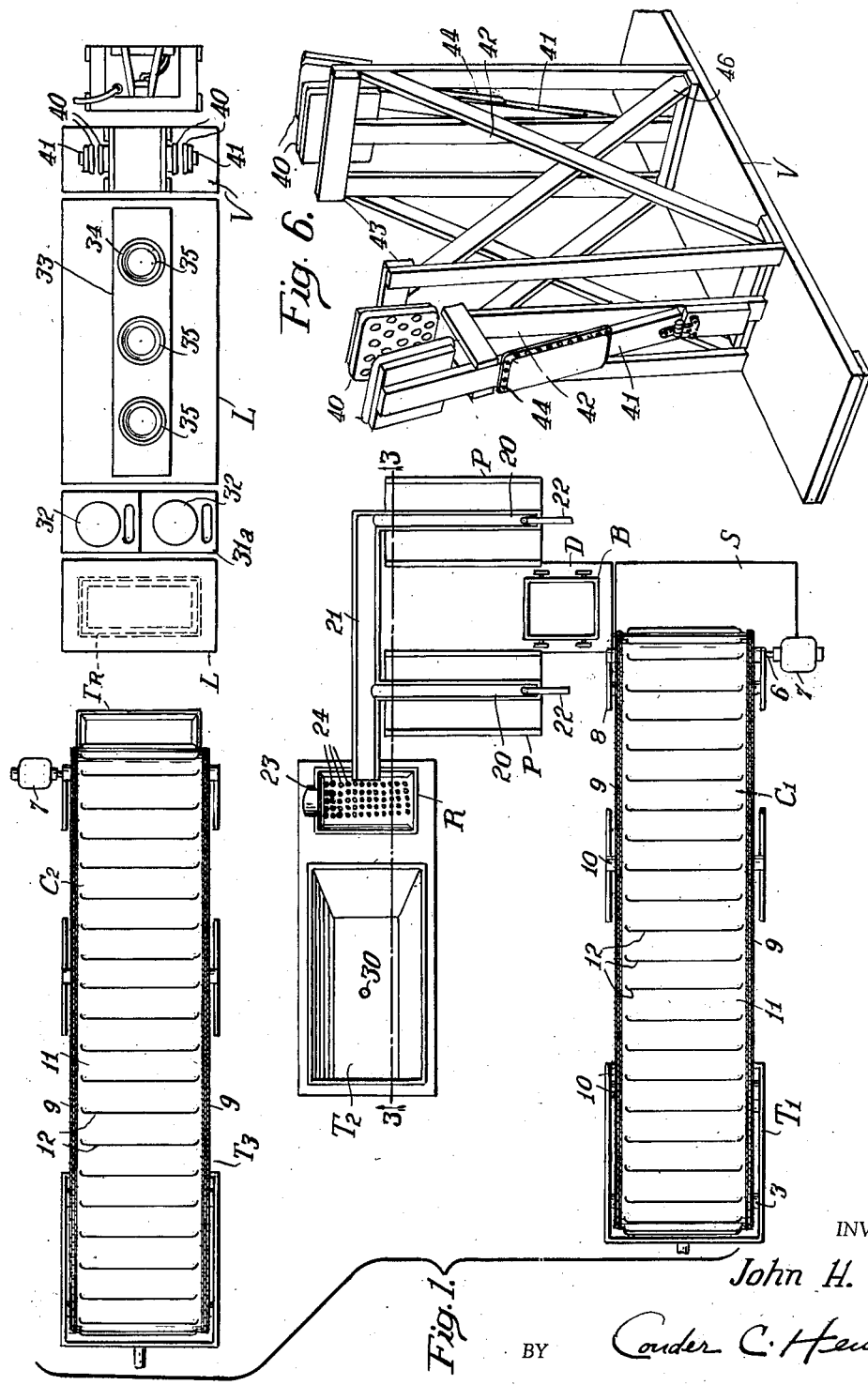
INVENTOR
John H. Wills
BY Conder C. Henry
ATTORNEY Dec. 16, 1952   J. H. WILLS   2,622,034
METHODS OF PROCESSING RAW SHRIMP MEAT FOR MARKET
Filed April 5, 1951   2 SHEETS—SHEET 2
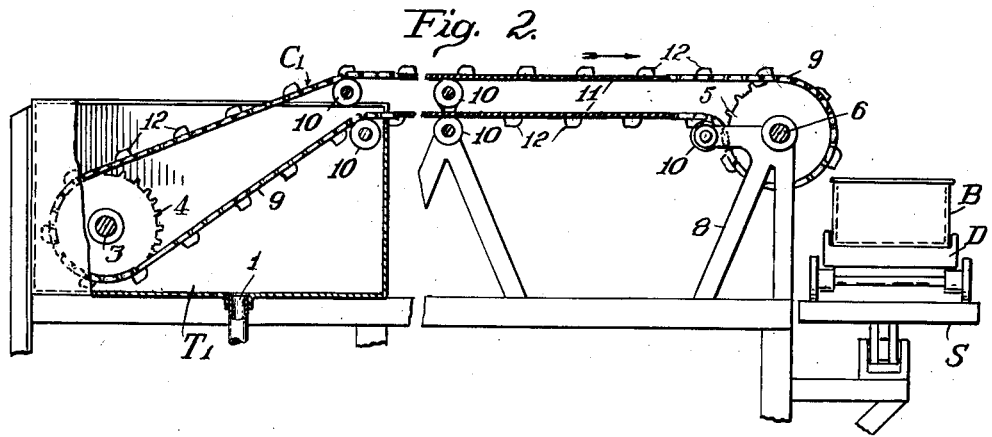
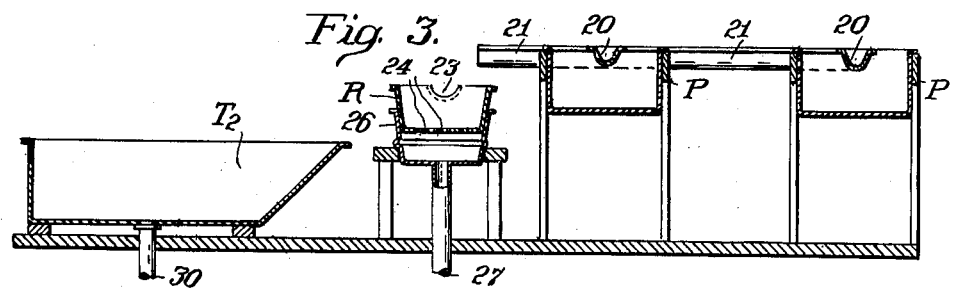
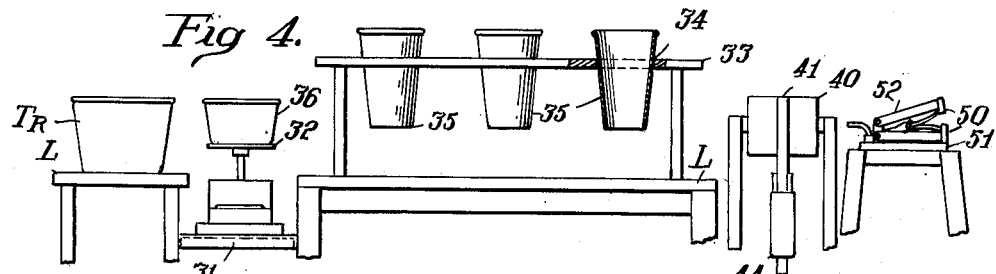
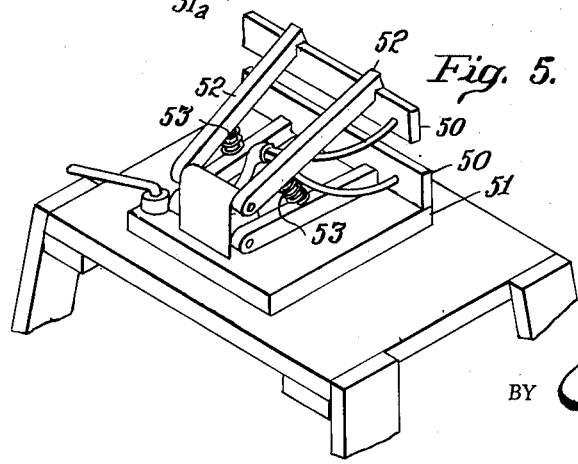
INVENTOR
John H. Wills
BY Conder C. Henry
ATTORNEY Patented Dec. 16, 1952

2,622,034

UNITED STATES PATENT OFFICE 2,622,034

METHODS OF PROCESSING RAW SHRIMP MEAT FOR MARKET

John H. Wills, Charlotte, N. C.

Application April 5, 1951, Serial No. 219,331

5 Claims. (Cl. 99—195)

My invention pertains to the art of preparing, dressing, packaging, transporting, and storing shrimp, and has for its general purpose to place better shrimp in homes from the fishing grounds with the least physical and chemical changes in them during the transportation period. More particularly it has for its object to provide a simple, efficient, and economical commercial process or method of preparing, packaging, and otherwise treating shrimp meat for transportation to remote points and of maintaining the same for long periods of time in a fresh, sweet, and wholesome condition, free from noxious odors and in a condition suitable for immediate cooking, without any further preparation, upon delivery to the consumer.

Also, my invention, according to a general and broad aspect thereof, contemplates an improved method by means of which shrimp may be so treated or prepared at the packing plant that the dressed and cleaned meat may be transported to local or distant markets while retaining its original freshness, or without liability of deterioration or decay, thus insuring its receipt by the consumer in a pan-ready condition and with its natural juices, proteins, tenderness, and flavors unimpaired.

My invention has for another of its aims to provide an improved commercial method according to which the multiplication of the bacterial content of shrimp and shrimp meat may be retarded during the processing of such meat for market, and such content reduced during its transportation and storage, to thus insure its receipt by the consumer at the peak of its perfection.

Another goal of my invention is to minimize, or eliminate, the factors which lower the quality of plant processed shrimp meat due to delays in delivery and of handling.

Still another purpose of my invention is the elimination of the necessity of using water ice in transporting shrimp meat over long distances, with a consequent saving in freight charges.

Further, my invention has for an additional object the processing of shrimp meat on a wholesale scale and packaging the same in a transparent, high moisture-vapor-proof container from which substantially all air has been expelled and simultaneously therewith shaping the contents of such container to a predetermined form so that the comestible not only may be packed for shipment and storage with the minimum waste of space but also may be pleasingly displayed to thereby enhance its consumer appeal, and thereafterwards low freezing the packaged meat to preserve it in its original goodness.

Other objects and advantages of my invention will become apparent from the description thereof hereinafter contained.

It is an observable fact that freshly netted shrimp are nearly odorless, absence of odor being determinative of quality. Soon after capture, however, depending upon atmospheric temperature and the manner in which the shrimp are dealt with, decay sets in and progresses rapidly until it is complete—much more so than in the case of animals and fowls. This phenomenon is due mainly to the action of certain oceanic and other saprophytic bacteria on the tissue of the shrimp, which bacteria have ocean water, in which the shrimp live, as their natural habitat. Such bacteria are always found in the slimy coating enveloping shrimp as well as in their mouths and skins or shells. For the most part, it is due to the decomposing action of these bacteria which causes shrimp to give off a disagreeable odor.

A part of such deterioration also is thought to result from chemical breakdown caused by enzymes present in the digestive tract of shrimp. As decomposition continues, the head loosens from the body at the thorax joint. At about the same time or shortly thereafter, the flesh becomes pinkish in color under the shell, accompanied by an odor of putrefaction. During warm weather this change usually occurs in unrefrigerated shrimp within 8 to 12 hours.

Many efforts heretofore have been made to solve the problem of so managing, packaging, and transporting unbutchered shrimp, and shrimp meat, for transportation over long distances and preserving them for long periods of time without deterioration or spoilage, and the degrees of success achieved have been noteworthy. In the main, such prior attempts simulated the methods of processing and otherwise handling perishable foods generally; but ordinarily shell fish decay very rapidly and, therefore, not any of such methods have been found entirely practical or successful as applied to shrimp insofar as their delivery in a truly fresh condition to distant markets is concerned. Indeed, such successes as have been attained are attributable to the fusing together or modifying old processes in order to adapt them for use in handling edibles of that kind. For example, the method of shipping sea foods alive packed on ice, as are lobsters, has been proposed; but the proposal has not been adopted because shrimp soon die after removal from their natural environment. However, a modification of this process, which has been in use for several years, is to pack unpeeled shrimp for transportation embedded in crushed ice. Such practice constitutes the first way—a way attended with many grave objections as will be later discussed—of the three principal ways in use today of plant processing shrimp for market, as distinguished from preparing them in homes for cooking.

The second of such principal ways is to head, shell, and cook shrimp for canning, and to can them. This method is known as a wet pack, and requires no refrigeration.

The third way referred to is to head shrimp and freeze them with their shells on. Occasionally some are frozen after they have been shelled and cooked, but this mode of procedure has been abandoned, except to the extent it has been revived through the development of the vacuum pack, where the shrimp are to be kept longer than the time necessary for transporting them to the place of sale or use.

Adverting to the first principal way mentioned, which is the method commonly employed for making ready freshly caught shrimp for long distance transportation, the practice is not to prepare the meat for cooking, or to cook them, at the packing establishment, but merely to cut off their heads after capture, leaving intact their tails, shells, and intestines or "veins," and then to pack them in wet ice for shipment and subsequent sale as "fresh" shrimp, alternating layers of ice with layers of shrimp. Upon arrival at their destination, the iced shrimp may be stored in refrigerators as received, or, if they are to be immediately consumed, their tails, shells, and "veins" are then removed so as to render the meat ready for washing and cooking. Alternatively, shrimp so packed, after receipt by the consumer, may be peeled, cleaned, packaged, and stored in a deep freezer in accordance with the recommendations of manufacturers of appliances of that kind.

Apparently, this instruction for preparing shrimp by the housewife processed by any one of the commercial methods hereinafter described and now in use, is based on such research studies as were earlier made by the Louisiana State University, and published in Food Freezing of November 1947, under the title "What Effects Do Cooking Time and Packaging Have on Frozen Boiled Shrimp?" As the description of my invention develops, it will be seen that the necessity for any such treatment by the consumer is entirely eliminated.

Returning, now, to the first mentioned manner of packing uncleaned and unpeeled shrimp in crushed ice for delivery at remote points, but not for subsequent storage, undoubtedly it is the most handy and acceptable of the prior factory methods. Nevertheless and as stated above, it is attended with serious disadvantages, among which are the effects of bacterial action and the possible action of enzymes previously discussed. Another drawback is the excessive freight charges necessarily incurred because of the necessity of shipping larger quantities of iced water in which the unshelled shrimp are packed. Ofttimes the ice and the waste matter of the shrimp weigh more than their edible portions.

When such method is employed, the reasons why the shells are left on are to prevent oxidation and dehydration of the flesh which otherwise would be exposed to the air, and to minimize its deterioration by improper handling and by direct contact with the ice and melted ice water in which the shrimp are packed for shipment, which ice and water becomes easily and progressively contaminated through drainage from the shrimp. The very fact, however, that these difficulties are lessened in the manner stated precludes the possibility of overcoming another one equally serious.

By not removing the skins or shells and the intestines, the bacteria, which are of the boring type, contained in the shells, and the enzymes contained in the intestines, have ample opportunity of penetrating the flesh, thus causing decomposition, which may range from partial to complete disintegration. For this reason it is conceived that unpeeled shrimp packed and shipped by this method, when served as cocktails—even in the best hostelries—have acquired a pink color and a dark streak down their backs and give off a noisome "shrimp-fishy" odor, all of which indicates at least partial spoilage.

Regarding the second method mentioned, it is common knowledge that canned shrimp is not particularly palatable. This method calls for the shrimp to be packed in salt water. After a short storage period the meat gets mealy and has very little flavor of a shrimp. This method is known as a wet pack and does not require refrigeration.

However, the third principal commercial method—the method of freezing—has met with considerable success, although not with widespread acceptance. Most of the uncooked shrimp now frozen at the packing plant are frozen with the heads removed, but not their tails, shells, and intestines. These headed shrimp are packed in 5 pound cold-wax telescoping cartons, and the packages, after being filled, are usually spread out on racks and trays and placed in a blast freezer. When the shrimp are frozen, the cartons are opened, and water is brushed or sprayed on the shrimp and allowed to freeze, thus forming a glaze of ice over the shells and tails of the shrimp. The purpose of leaving on the shells and glazing is to prevent dehydration. Sometimes the shrimp are peeled before glazing, but the practice is not recommended for reasons which will later appear.

This glazing practice presents a problem in extra handling, and adds about 1½ pounds of extra weight to a 5 pound carton. Additionally, by leaving on the shells and by not removing the intestines, the meat remains in constant contact with the bacterial contents thereof. On the other hand, if the shells and intestines are removed, experiments have shown that glazing of the meat at all temperatures below $-12°$ C. ($10°$ F.) actually exerts a protective effect on the bacteria present. For example, after 9 months storage the bacteria count of headless peeled shrimp maintained frozen at $-18°$ C. ($0°$ F.) was as follows: Glazed, 520,000 bacteria per gram; unglazed, 52,000 bacteria per gram. Similarly, headless peeled glazed shrimp maintained at a temperature of $-40°$ C. ($-40°$ F.) for 12 months had a bacterial count of 250,000 per gram, whereas under the same conditions unglazed shrimp had a bacterial count of only 110,000 per gram. My method results in corresponding reductions.

Regardless, however, of which of the foregoing commercial methods of packing shrimp for market is used, any changes in quality in shrimp after they leave the packing plants and before they reach the consumer, are the results in delays and improper handling. It is to avoid the unwanted results of such delays and improper handling as affecting the quality of plant processed shrimp meat, that my invention is directed. It aims to meet several requirements.

For example, the Louisiana Agriculture Experiment Station and Bacteriology Department, Louisiana State University, in a report entitled, "Bacteriology of Shrimp," by Doris Holmes and C. S. McCleskey, published on September 16, 1947, found that the quality of frozen unpeeled shrimp is directly related to the care used in the pre-freezing selection, preparation, and packaging of the product, and the promptness of freezing the shrimp after preparation. I find that the same thing is true with respect to shrimp meat, and also that the manner of freezing is most important, as will be later explained, and that where the meat is destined for delivery on distant markets, the way in which it is packed for shipment is determinative of the cost involved and its keeping qualities. My method involves all of these considerations.

Insofar as it has any rapport to either of the hereinbefore described principal commercial methods of processing shrimp, or shrimp meat, it is more nearly related to the third one because of the freezing techniques employed and the sameness of the ultimate purpose desired to be accomplished. The points of coincidence and difference will become apparent from the description of my method, which will now be described in detail in connection with one form of plant layout on which it is based as its environment, together with the instrumentalities employed in such plant, although my method may be—and in a large measure is—practiced by hand. From such description, it will be seen that, contrasted with the old processes, my method involves new steps integrated with a new sequence of old ones whereby shrimp obtained from trawlers packed in crushed ice are plant processed in a new manner before marketing and as soon after capture as possible in order to render them ready for immediate cooking, without any further preparation, upon receipt by the consumer. To these ends, and in the attainment of the objects and goals of my invention hereinbefore enumerated, I employ certain contrivances and mechanisms and arrange them in a special way to secure factory efficiency and quantity production, as illustrated in the accompanying drawings, in which like reference characters refer to like parts and in which—

Fig. 1 is a plan view of one form of plant layout of the machines and other equipment used in practicing my method.

Fig. 2 is a front elevation, with parts, broken away of the conveyor system and scales illustrated by Fig. 1.

Fig. 3 is a longitudinal sectional view along the line 3—3 of Fig. 1.

Fig. 4 is a front elevation of the work table, racks, and sealer.

Fig. 5 is a perspective view of the sealer.

Fig. 6 is a perspective view of the presser or vice.

In the instant exemplification of the mechanisms and devices used in carrying out or practicing my invention on a commercial scale, it will be seen from the drawings that I employ several pieces of apparatus and equipment juxtaposed with respect to each other in a manner to facilitate processing and to secure a continuous and efficient flow of shrimp as they pass from one work station to another. Obviously, the arrangement may be altered to fit into the space available and may be installed on the same floor or on different floors of the same building.

Initially, I wash the shrimp in the form they are taken from the nets in order to remove their slime-carrying bacteria and to separate them from the ice in which they are packed when removed from the trawlers, and thereafterwards I weight them.

In performing these acts, I employ an endless shrimp conveyor, designated generally by the reference letter $C_1$, extending upwardly from within and longitudinally of a combined shrimp washer and ice-separation tank $T_1$ and terminating at the edge of a platform scale S on which is adapted to be rolled a truck or dolly D carrying a shrimp receptacle or basket B. The truck or dolly and the basket are of conventional construction.

Such tank is approximately 10 feet long, 4 feet wide, and 4 feet deep, and is provided with a drain 1 in its bottom, which remains always open. Fresh water is continuously supplied to such tank through a pipe. For convenience of use, the tank is placed in the landing shed as near the anchored trawler as may be convenient.

Mounted within and extending across one end of the tank adjacent the bottom thereof is a shaft 3 carrying sprockets 4 on its ends. Similar sprockets 5 are mounted on the ends of a shaft 6 driven by a motor 7 suitably supported by uprights 8 adjacent the front edge of the platform scale mentioned. The two shafts, which are spaced about 40 feet apart, are parallel to each other and, hence, the sprockets on the same side of both shafts are oppositely disposed. An endless sprocket chain 9 passes around each pair of oppositely disposed sprockets, and such chains are held in engagement with the sprockets by idler rollers 10 bearing against the under sides of the chains. Extending horizontally between the chains and attached thereto is an endless belt 11 carrying on its outer surface a plurality of spaced cross-fins or buckets 12.

In using the described equipment, the shrimp and the crushed ice in which they are packed are shoveled into buckets from the hold of a trawler tied up at the unloading shed. Such buckets are then carried by hand to the tank $T_1$ and the contents thereof emptied into such tank. Here the slime carrying bacteria is washed off of the shrimp by reason of their immersion in water, the shrimp sinking onto the conveyor belt because of their relatively high specific gravity, while the ice remains floating.

It will be noted in this connection that due to the continuous replacement of the water in the tank, it always remains comparatively pure. Moreover, the water and, hence, the shrimp therein, remains cold because of the ice added thereto.

As the shrimp sink onto the belt, they are carried upwardly and dumped into the basket B and are thereupon weighed on the platform scale along with the basket and the truck or dolly on which the basket is placed.

After weighing, the shrimp are "picked" or butchered, which consists of removing their heads, tails, and skins or shells, as well as their intestines or "veins"; and the shrimp meat subsequently receives a preliminary washing. For this purpose, I utilize one or more "picking" tables P and a skimmer R.

The picking tables may be arranged at any suitable angle, or at any location, with respect to the scales, but for convenience I prefer to arrange them in parallel spaced relationship with respect to each other and at right angles to and near the shrimp conveyor and weighing scale so that the truck carrying the shrimp filled basket may be run therebetween or around the ends thereof nearest the weighing scale and unloaded without undue loss of time. Each table has a built-in main water flume 20 extending longitudinally of its center, the top of each flume being approximately flush with the top of the table, and the ends of all such flumes furthest removed from the conveyor $C_1$, terminating in a drain flume 21, extending at right angles to the main flumes. One end of the main flume is open and empties into the skimmer. The flumes are supplied continuously with fresh water delivered through pipes 22.

The skimmer R, which is simply a shallow pan provided with a spout 23 and having holes 24 in its bottom, is held immediately under the free end of the main flume by resting on top of a funnel shaped receptacle 26, also having a drain 27 therein.

As previously stated, the truck carrying the shrimp filled basket may be rolled between or alongside of the picking tables, and the shrimp emptied from the basket onto such tables. Here any defective specimens and trash are removed and discarded. The remaining specimens are headed, "veined," and shelled by hand, although a well known type of deveining machine may be used. This processing should take place within two hours after the shrimp are taken from the nets because, if shrimp are beheaded within that time, nearly all of the intestine or "vein" will remain attached to the head and will pull free from the shrimp as the head is removed. If the beheading is done later, the intestine breaks loose from the head at the thorax, due to the very rapid breakdown of the walls of the intestine.

Thereafterwards, the shrimp meat is tossed into the main flumes, where it is washed down to and through the drain flume and discharged into the skimmer. Meantime the meat is preliminarily washed because of its immersion in water.

Also, it is important that the foregoing steps be performed as soon after weighing as possible so that the temperature of the meat and, hence, the development of bacteria therein, will not become substantially higher than it was when the unprocessed shrimp were taken out of the ice water in the washer $T_1$. To insure, however, that the bacterial development in the meat will be arrested or retarded during subsequent processing and will become firmed for further handling and also to prevent the meat from becoming dried out, I next chill the meat to approximately 0° C. (32° F.) by packing it in crushed ice.

For this purpose, I employ a large ice tank $T_2$ having a drain 30 in its bottom and positioned in close proximity to the open end of the drain flume. As often as the skimmer is filled with a sufficient quantity of meat, it is carried by hand and emptied into the tank $T_2$ and packed in crushed ice until the tank is substantially filled, layers of meat alternating with layers of ice and each such layer being approximately three inches thick. Here the meat is allowed to remain until completely chilled. As the ice melts, the melted ice water, which becomes easily contaminated through drainage from or contact with the meat, is drained off through the drain, 30.

The next step in my process consists of thoroughly washing and inspecting the chilled meat.

Here, again, I employ a tank $T_3$, called a "meat washer," and an endless meat conveyor $C_2$ arranged alongside the ice tank $T_2$. Inasmuch as such conveyor is identical in construction and operation as the previously described shrimp conveyor $C_1$ and is disposed with respect to the meat washer in the same manner as the conveyor $C_1$ is disposed with respect to its tank, I have applied the same reference numerals to the parts thereof, and it will be understood that the description of the construction and operation of the first conveyor is applicable to the latter.

For washing, the meat and the ice in which it is packed is shoveled into the meat washer, where the meat sinks onto the conveyor belt while the ice remains floating. The meat is carried upwardly by the belt and discharged into a removable tray, $Tr$, resting on a suitable support. The endless belt or conveyor is about 40 feet in length and moves slowly. As the meat is transferred from the meat washer to the tray, inspectors who stand alongside the conveyor remove any defective meat or broken pieces, so that the meat delivered by the conveyor is first-class in grade.

The washed and chilled meat is then weighed to form packages of predetermined sizes, and tightly packed in sealed containers. Any kind of vapor-moisture-proof container may be employed; but preferably I employ bags fabricated of polyethylene which becomes tacky upon the application of heat and pressure.

At this stage, the equipment used consists of a specially designed work table L arranged near the discharge end of the conveyor $C_2$. Formed in the top of the table and extending cross-wise thereof intermediate its ends is a channel $31a$ adapted to receive flat top weighing scales 32. An elevated funnel rack 33, having openings 34 therein for receiving funnels 35, is mounted longitudinally of and on top of such table.

The meat filled pans are removed by hand from the end of the conveyor $C_2$ and are placed on the end of the work table, and the meat is weighed in a suitable cup 36 on one of the scales 32. Thereupon, a bag is sleeved over the end of one of the funnels and the meat poured into such bag through the funnel. Thereupon the meat filled bag is ready for further treatment.

Such treatment consists of expelling substantially all of the gas or vapor generically termed "air" from the bag and simultaneously therewith compressing the meat therein into a more or less rectangular cakelike form under yieldable pressure so as not to crush the meat in the bag.

For this purpose, I employ a double clamping mechanism or vice V having jaws cushioned on their inner surfaces with sponge rubber pads 40. Essentially, such vice consists of a frame support 46, in which is mounted on each side thereof two upright arms 41 and 42, carrying on their outermost ends and facing each other the pads mentioned. One of such arms 41 is hinged thereto at its lower end, the movable or swingable arm being knee operated by pressing against a knee pad 44 attached intermediate the ends thereof, although it will be understood that the same may be operated by any known mechanism applicable to devices of that kind. The technique employed is for a workman to grasp a meat filled bag by its sides with its open end up and hold the same between the jaws of the vice, and then operate the vice.

From the construction of the vice, it will be seen that when pressure is applied to the meat filled bag through the sponge rubber pads, air is expelled therefrom and, at the same time, the meat therein is cushion compressed, due to the yieldability of the rubber sponge pads under pressure, into cake form without injury to the tissues of the meat.

The bag then is hermetically sealed. While still holding the bag by its sides and after shaping as aforesaid, the workman places the open end of the bag between the elongated, oppositely disposed heating irons 50 of a sealing device. Such device is a well known type of tool and consists of the irons mentioned, which are electrically heated by induction. One of such irons is mounted on, but electrically insulated from, a base member 51, and the other is mounted on and electrically insulated from a swingable arm 52 pivoted to such base, such arm being spring biased by a spring 53 to open position. The iron is manually operated. Another convenient method of sealing is to employ an electronic binder such as is disclosed by the patent to Hoyler, No. 2,525,355, granted October 10, 1950.

I contemplate using as a substitute for the described vice and sealer a combined packing and sealing machine which will form the subject-matter of another application.

After sealing, one or more filled bags are immediately subjected to deep freezing, or boxed and subjected to such freezing. It is important that such freezing be done very rapidly as by subjecting the same to a temperature of about −40° C. or lower in order to prevent the water in the shrimp from freezing in large globs and thereby exploding the tissue of the meat. With a slow freeze, such as takes place in home freezing methods, the meat not only deteriorates but when the shrimp are thawed there is an excessive amount of leaching, thus causing a loss in flavor after freezing. Although the temperature mentioned is not critical, yet I have found that by using such temperature (−40° C.) 4 days after freezing the previously chilled and peeled shrimp indicated an apparent reduction in bacterial count of 82 per cent.

Finally, a number of boxes of shrimp meat thus frozen preferably are packed into a larger box with Dry Ice and shipped to the purchaser, or shipped in refrigerated trucks or in specially constructed refrigerators, and the purchaser either may cook the meat at once without any further preparation, or store it in a refrigerator for later use.

In practicing my invention, it will be understood, of course, that all utensils, machinery, and equipment used, whether coming into contact with the shrimp or not, should be kept scrupulously clean and sterilized at frequent intervals by the use of steam or antiseptic solutions, and similarly the rooms in which such operations are carried on as well as the garments and hands of the operators, should be maintained in thoroughly sterilized and sanitary condition. It will be further understood that by my method the shrimp meat is not at any time permitted to become warm or below 50° F., from the time they leave the water until frozen. The reason for this is that if shrimp meat as ordinarily packaged is frozen at room temperature, the outside of the mass will freeze, sealing the heat in the middle and thus creating a condition for rapid spoilage.

Although my method has been described as peculiarly applicable to the packing and transportation of shrimp meat, it will be understood that its use is contemplated in connection with other sea food to which the same may be applicable.

Having thus described my said invention, what I claim and desire to secure by Letters Patent is:

1. The commercial method of preparing for market freshly caught shrimp delivered packed in crushed ice at a shrimp packing establishment comprising, separating the shrimp from the ice in which they are packed by floating off the ice from the shrimp and simultaneously washing the same; then removing the heads, tails, shells, and intestines from the shrimp; subsequently placing the shrimp meat in water so as to float off the waste matter therefrom; thereafterwards chilling such meat by packing the same in crushed ice to prevent dehydration of the meat and to arrest the development of bacterial action therein; then washing such meat and, after washing, placing it in a transparent, vapor-moisture-proof bag which becomes tacky upon the application of heat and pressure; thereafterwards pressing the air from such bag by the application of a cushioned pressure and simultaneously therewith shaping the contents thereof; then sealing such bag by developing heat in and simultaneously applying pressure to the sides thereof along a line contiguous to its open end to thereby cause the sides of said bag to become tacky and adhere together only along said line; then placing such meat filled bag in a box and thereafterwards quickly freezing the contents of such bag by subjecting the same to a temperature of approximately −40° C. until such contents are solidly frozen; then placing such box with other boxes similarly prepared in a carton and maintaining the temperature of the contents of such boxes at the temperature mentioned until ready for shipment; and, finally, placing Dry Ice in such carton when the same is shipped.

2. The commercial method of preparing freshly netted shrimp for market comprising, removing the heads, tails, shells, and intestines from the shrimp; then chilling the meat; then washing the meat; thereafterwards packing the raw meat in a container to form a package and subsequently removing substantially all of the air from such package and simultaneously therewith shaping the same; then sealing such package to form an air-tight seal; subsequently subjecting such meat filled package to low refrigeration to quickly freeze the same; and finally boxing such package with Dry Ice for shipment.

3. The industrial method of preparing freshly netted shrimp for market which includes maintaining the shrimp chilled at all times until the meat is packaged for shipment and comprises removing their heads, tails, shells, and intestines; packing the shrimp meat in an air-tight bag; then subjecting such bag to cushioned pressure to shape the same and remove the air therefrom; then sealing the bag; then quickly freezing such meat until it is solidly frozen; and then packing the frozen meat with Dry Ice for shipment.

4. The method of preparing and packaging shrimp meat for market comprising, first, removing the heads, tails, shells, and intestines from the shrimp; thereafterwards washing the shrimp meat; then packing the washed meat in crushed ice; subsequently separating the ice from such meat and simultaneously therewith washing the meat; next, packing the meat in a bag; then removing substantially all of the air from said bag and simultaneously therewith shaping the bag and its contents into a predetermined form; then sealing said bag with an air-tight seal; then subjecting the meat filled bag to a temperature substantially below 0° F. to quick freeze the same; and, finally, packing such bag with Dry Ice for transportation.

5. The commercial method of preparing shrimp meat for market comprising, first, removing the heads, tails, shells, and intestines from the shrimp; then washing the meat; thereafterwards chilling the meat; thereafterwards placing the chilled meat in a high vapor-moisture-proof container; subsequently removing substantially all of the air from said container and shaping the contents thereof to a predetermined form; then sealing said container to make it air tight; then subjecting the meat filled container to an air blast substantially below 0° F.; and, finally, packing said container in a refrigerated enclosure for shipment.

JOHN H. WILLS.

REFERENCES CITED

The following references are of record in the file of this patent:

UNITED STATES PATENTS

| Number | Name | Date |
|---|---|---|
| 2,365,519 | Bloedorn | Dec. 19, 1944 |
| 2,467,268 | Merkle | Apr. 12, 1949 |
| 2,525,096 | Damuth | Oct. 10, 1950 |

OTHER REFERENCES

"The Freezing Preservation of Foods," 1947, by D. K. Tressler et al., published by The Avic Publishing Company, Inc., New York, pages 587, 596, inclusive.